(12) United States Patent
Maessen et al.

(10) Patent No.: US 10,767,712 B2
(45) Date of Patent: Sep. 8, 2020

(54) FILL PARAMETER LEARNING FOR WET PLATE CLUTCHES BASED ON AN OUTPUT OF A TORQUE CONVERTER

(71) Applicant: DANA BELGIUM N.V., Bruges (BE)

(72) Inventors: Mark M. A. Maessen, Roermond (NL); Keivan Shariatmadar, Eeklo (BE); Mark R. J. Versteyhe, Oostkamp (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 16/306,212

(22) PCT Filed: May 24, 2017

(86) PCT No.: PCT/EP2017/062581
§ 371 (c)(1),
(2) Date: Nov. 30, 2018

(87) PCT Pub. No.: WO2017/207394
PCT Pub. Date: Dec. 7, 2017

(65) Prior Publication Data
US 2019/0162254 A1 May 30, 2019

(30) Foreign Application Priority Data
May 30, 2016 (EP) ..................................... 16172054

(51) Int. Cl.
*F16D 48/06* (2006.01)
(52) U.S. Cl.
CPC ........ *F16D 48/066* (2013.01); *F16D 2300/18* (2013.01); *F16D 2500/1026* (2013.01);
(Continued)
(58) Field of Classification Search
CPC ........... F16D 48/066; F16D 2500/5102; F16D 2500/5014; F16D 2500/30412;
(Continued)

(56) References Cited

U.S. PATENT DOCUMENTS 4,855,913 A 8/1989 Brekkestran
5,580,332 A * 12/1996 Mitchell ............... F16H 61/061
475/123
(Continued)

FOREIGN PATENT DOCUMENTS

WO 2013029058 2/2013
WO 2014173893 10/2014

OTHER PUBLICATIONS

European Patent Office, International Search Report with Written Opinion issued in PCT/EP2017/062581, dated Jul. 14, 2017, 12 pages, European Patent Office, Rijswijk, Netherlands.

*Primary Examiner* — David J Hlavka
(74) *Attorney, Agent, or Firm* — Marshall & Melhorn, LLC (57) ABSTRACT

A system and method for determining filling parameters of a wet clutch system used with a transmission is provided. The method comprises the steps of collecting information about the torque output of the torque converter of the transmission during a filling process associated with the wet clutch system, analyzing the signal associated with the torque output of the torque converter within a time period of the filling process associated with the wet clutch system, and identifying when the signal associated with the torque output of the torque converter changes with respect to the time period of the filling process of the piston to determine a filling parameter associated with the wet clutch system. The system and method eliminates a need for recalibrating the transmission and accommodates production variances for components and assembly of systems using wet clutch systems.

17 Claims, 10 Drawing Sheets

(52) U.S. Cl.
CPC .............. *F16D 2500/10412* (2013.01); *F16D 2500/30412* (2013.01); *F16D 2500/5014* (2013.01); *F16D 2500/5102* (2013.01)

(58) Field of Classification Search
CPC ... F16D 2500/10412; F16D 2500/1026; F16D 2300/18
See application file for complete search history.

(56) References Cited

U.S. PATENT DOCUMENTS

| | | |
|---|---|---|
| 5,719,768 A | 2/1998 | Tashiro |
| 5,853,076 A | 12/1998 | McKee |
| 6,253,140 B1 | 6/2001 | Jain |
| 6,341,552 B1 | 1/2002 | Potter |
| H2031 H | 6/2002 | Harrell |
| 6,637,566 B2 | 10/2003 | Takatori |
| 7,641,031 B2 | 1/2010 | Nakamura |
| 8,265,848 B2 | 9/2012 | Lochocki, Jr. |
| 8,682,555 B2 | 3/2014 | Pinte |
| 8,849,530 B2 | 9/2014 | Thor |
| 9,080,619 B2 | 7/2015 | Li |
| 9,695,890 B2 * | 7/2017 | Bieber .................. F16D 48/066 |
| 2004/0122577 A1 | 6/2004 | Ford |
| 2005/0283297 A1 | 12/2005 | Surianarayanan |
| 2007/0199794 A1 | 8/2007 | Miyazaki |
| 2009/0299583 A1 | 12/2009 | Dell Eva |
| 2011/0112737 A1 | 5/2011 | Neelakantan |
| 2012/0067690 A1 * | 3/2012 | Postic .................. F16D 48/066 192/85.63 |
| 2014/0277978 A1 | 9/2014 | Versteyhe |

* cited by examiner

FILL PARAMETER LEARNING FOR WET PLATE CLUTCHES BASED ON AN OUTPUT OF A TORQUE CONVERTER

FIELD

An apparatus and method that relates to the operation of hydraulic clutches and more specifically to a system and method for adapting filling parameters for wet plate clutches is disclosed.

BACKGROUND

In the shifting of a stepped ratio transmission, clutches are engaged and disengaged to allow for power transfer through a plurality of different power paths. Typically, when a shift is performed, one clutch is disengaged (also known as an off-going clutch) by decreasing an oil pressure on a piston of the clutch and another clutch is engaged (also known as an oncoming clutch) by increasing a pressure on a piston of the clutch. During an overlap shift, this process happens simultaneously in a coordinated manner. In a filling phase of a shift, the piston of the ongoing clutch is positioned adjacent a plurality of friction plates by regulating a pressure of the transmission fluid.

A positioning of the piston is performed by using a controller to regulate an amount of current applied to an electroproportional valve. In response to the regulated current, the electroproportional valve applies a pressure to a piston chamber of the clutch. Depending on a force created by this pressure, a position of the piston can be controlled. Typically, it is desired to position the piston adjacent a set of friction plates as fast as possible while making sure an engagement of the friction plates occurs in a smooth manner.

A pressure profile employed by the controller may be dependent on many variables, such as, but not limited to a plurality of mechanical characteristics of the clutch, a temperature of an automatic transmission fluid and an amount of air within the fluid conduit. Generally, these variables can be taken into account by scheduling the two parameters with which the pressure profile is parameterized.

A problem that remains however, is how to obtain a correct value for each of these parameters. The value should be specific for a transmission and even for an individual clutch. Currently, it is common practice for the filling parameters to be determined through a calibration process. The calibration process is performed following vehicle production and then the calibration process is repeated at fixed intervals based on a number of operating hours of the vehicle. Typically, the process takes place through the following steps. After a predetermined number of operating hours, the controller of the transmission indicates that a recalibration is advised. When the calibration process is started, the controller sends out a number of filling profiles with changing fill parameters to a valve of the transmission. This process is continued until adequate filling is achieved for the corresponding clutch. The timing of a drop in torque converter speed ratio is used as an indicator for a quality of the filling of the clutch. The drop is indicative of torque transfer through the clutch, which is a sign of the piston contacting the set of friction plates. The calibration process is then repeated for each of the remaining clutches.

While the calibration process described above is capable of determining the correct filling parameters, it does so only for fixed conditions. The calibration process is performed with a transmission that has been warmed up and a time between fillings is very short in duration. As a result, the parameters that are obtained are in fact only valid in conditions similar to those that were present during the calibration. During actual use of the transmission, artificial and approximate correction factors need to be applied to compensate for such a calibration. The correction factors are not in all cases a good representation of the characteristics of the actual system, which can lead to errors in the filling and consequently, poor shift quality.

Further, tolerances on the production process of the components of the transmission are partially responsible for the variability during the filling process. While generally accurate parameters can be obtained by performing a calibration following production, the system also changes as the friction plates wear, an automatic transmission fluid wears out, and a stiffness of a clutch spring deteriorates. The optimal values of these parameters change over time. The current typical calibration process which is used to solve these problems takes a considerable amount of time, and during the calibration process the vehicle cannot be used. As an amount of the time between recalibrations is not based on the actual condition of the transmission, but rather as a fixed number of operating hours, reducing a number of recalibrations is achieved by imposing limitations on the mechanical system. During production, tight tolerances are imposed on both components and assembly of the system. These tolerances, which increase a cost of the system, could be relaxed if a method were available to determine the correct parameters for the filling of a specific clutch and to keep them within acceptable bounds over a lifetime of the clutch.

Furthermore, only the usage of a single type of transmission fluid is recommended by the manufacturer, as the temperature or viscosity compensation factors are only valid for the recommended type of transmission fluid. Lack of versatility in this respect can increase ownership and maintenance costs of the vehicle.

Another problem with the current typical calibration process is that the transmission controller is not aware when a bad shift is performed as a result of unsuitable fill parameters. Even though the mechanical system might have changed considerably, the controller maintains use of the same parameters until the calibration process is initiated manually or the recommended number of operating hours between calibrations is reached.

It would be advantageous to develop a system and method for adapting filling parameters for wet plate clutches that eliminates a need for recalibrating an associated transmission and accommodates production variances for components and assembly of systems using wet plate clutches.

SUMMARY

Presently provided by the invention, a system and method for adapting filling parameters for wet plate clutches that eliminates a need for recalibrating an associated transmission and accommodates production variances for components and assembly of systems using wet plate clutches, has surprisingly been discovered.

In one embodiment, the present invention is directed to a method for determining filling parameters of a wet clutch system used with a transmission. The method comprises the steps of determining a value regarding a torque output of a torque converter of the transmission, the value indicative of a filling parameter associated with the wet clutch system, collecting information about the torque output of the torque converter of the transmission during a filling process associated with the wet clutch system, analyzing the signal associated with the torque output of the torque converter within a time period of the filling process associated with the wet clutch system, and identifying when the signal associated with the torque output of the torque converter changes with respect to the time period of the filling process of the piston to determine a filling parameter associated with the wet clutch system.

In another embodiment, the present invention is directed to a system for determining filling parameters of a wet clutch system used with a transmission. The system comprises a transmission, the wet clutch system, and a controller. The transmission includes a torque converter and at least one sensor. The wet clutch system includes a piston assembly and a clutching assembly, the clutching assembly for engaging a portion of the transmission. The controller is in communication with a portion of the wet clutch system and the at least one sensor. Information about the torque output of the torque converter during a filling process of the clutching assembly is collected using the at least one sensor and the controller and compared to a time period of the filling process. The controller identifies when information about the torque output of the torque converter changes with respect to the time period of the filling process of the piston to determine a filling parameter associated with the wet clutch system.

Various aspects of this invention will become apparent to those skilled in the art from the following detailed description of the preferred embodiment, when read in light of the accompanying drawings.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
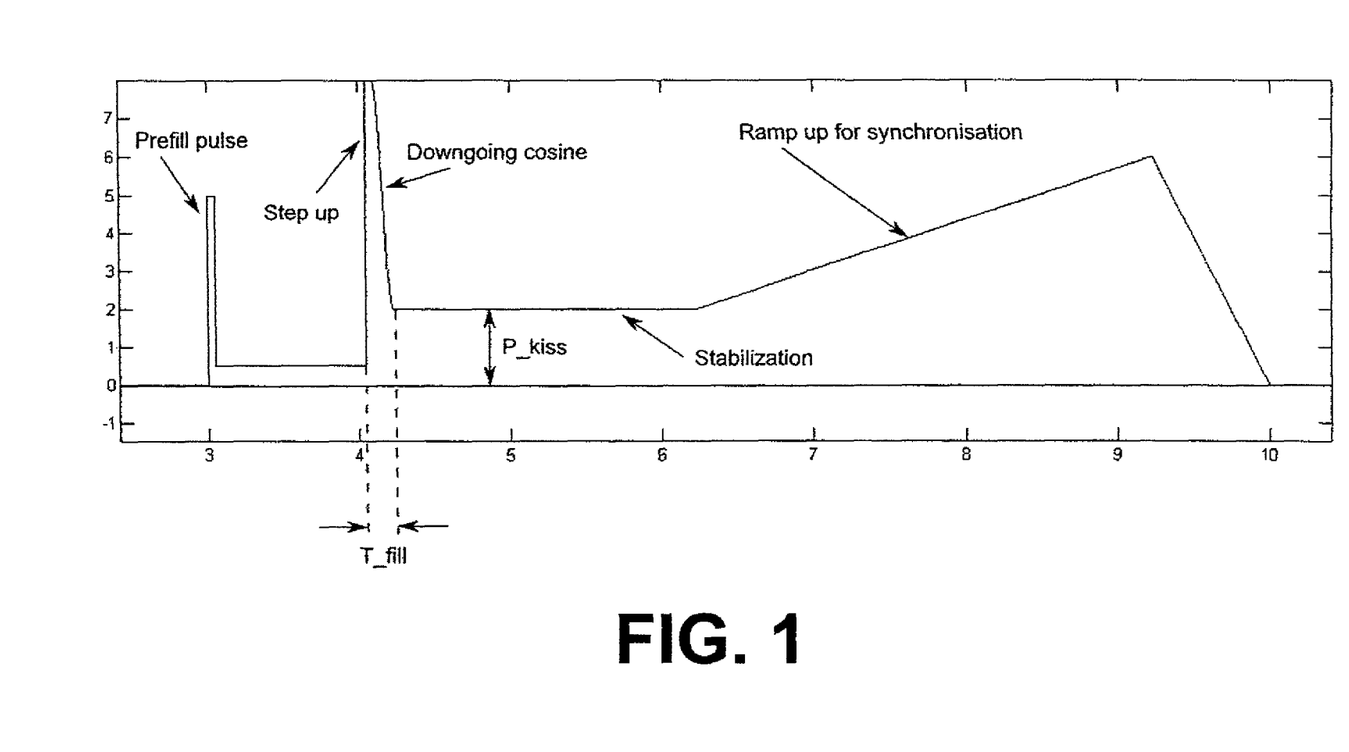
FIG. 1 is a chart of an exemplary pressure profile of a process of filling of a clutch, the exemplary pressure profile characterized by a fill time and a kiss pressure.

A process of filling of a clutch is commonly characterized by two main parameters, a fill time and a kiss pressure. These parameters are shown on an exemplary pressure profile, which is illustrated in FIG. 1. A reference of "T_fill" in FIG. 1 indicates the fill time of the exemplary pressure profile, and a reference of "P_kiss" indicates the kiss pressure of the exemplary pressure profile. It should be noted that an apparatus and a method described herein is also applicable when more parameters than a fill time and a kiss pressure are analyzed.

The fill time indicates a length in time of a pressure profile required to fill a piston chamber with hydraulic oil and to position a piston against a set of friction plates of the clutch. The kiss pressure is a pressure following the fill time for a pressure profile. The kiss pressure indicates a hydraulic force necessary to counteract a spring force once the piston is placed against the set of friction plates. While the kiss pressure changes slowly over time as a plurality of mechanical characteristics of a clutch system including the clutch change, the fill time is dependent on other factors. Primarily, the fill time is function of a temperature of a transmission oil used with the clutch, a pressure signal used with the clutch system, and an amount of time between shifts.

The present invention provides a learning algorithm which may be used to adapt a set of fill parameters. The learning algorithm determines how to adapt the set of fill parameters by evaluating a previous clutch filling and adapting the parameters for the next clutch filling. The learning algorithm may be used during normal operation of a vehicle including the clutch. In particular, the algorithm described herein may be applied during shifting of the transmission. As a result, the learning algorithm requires no specialized shifting processes or adaptation of a pressure profile using a controller. By evaluating a previous filling process for the clutch and adapting a set of fill parameters for the next filling process, the learning algorithm makes use of a last best estimate of the fill parameters.

A primary concern that the invention addresses is how to observe and quantify errors in the clutch filling process when the process happens in a suboptimal manner. On a production level transmission, a number of sensors which can be used as sources of information to observe the clutch filling process is limited. While a torque output of the transmission is an excellent indication of the quality of the clutch filling process, such a measurement is not available on production level transmissions. An acceleration of a vehicle, however, is directly linked to the torque output, and thus a speed signal. Further, as described hereinbelow, many methods may be used to estimate the torque output of the torque converter. As non-limiting examples, the torque output of the torque converter may be estimated by analyzing a speed ratio of the torque converter or a deflection of a drivetrain component or components (such as an axle). Further, it is understood that the torque output of the torque converter may be estimated by combining such methods.

The speed ratio of the torque converter, after analysis (described hereinbelow), can reveal information on how well a shift of the transmission is performed. However, the use of the speed ratio during a power shift (where one clutch is on-going and another clutch is off-going) may be limited as the speed relations are kinematically fixed when a clutch "sticks." Further, speed ratio errors can be introduced when good filling parameters are present, but when bad overlap timing occurs. Accordingly, the use of a method based on analysis of the speed ratio is most effective for vehicle launches.

Figure 2:
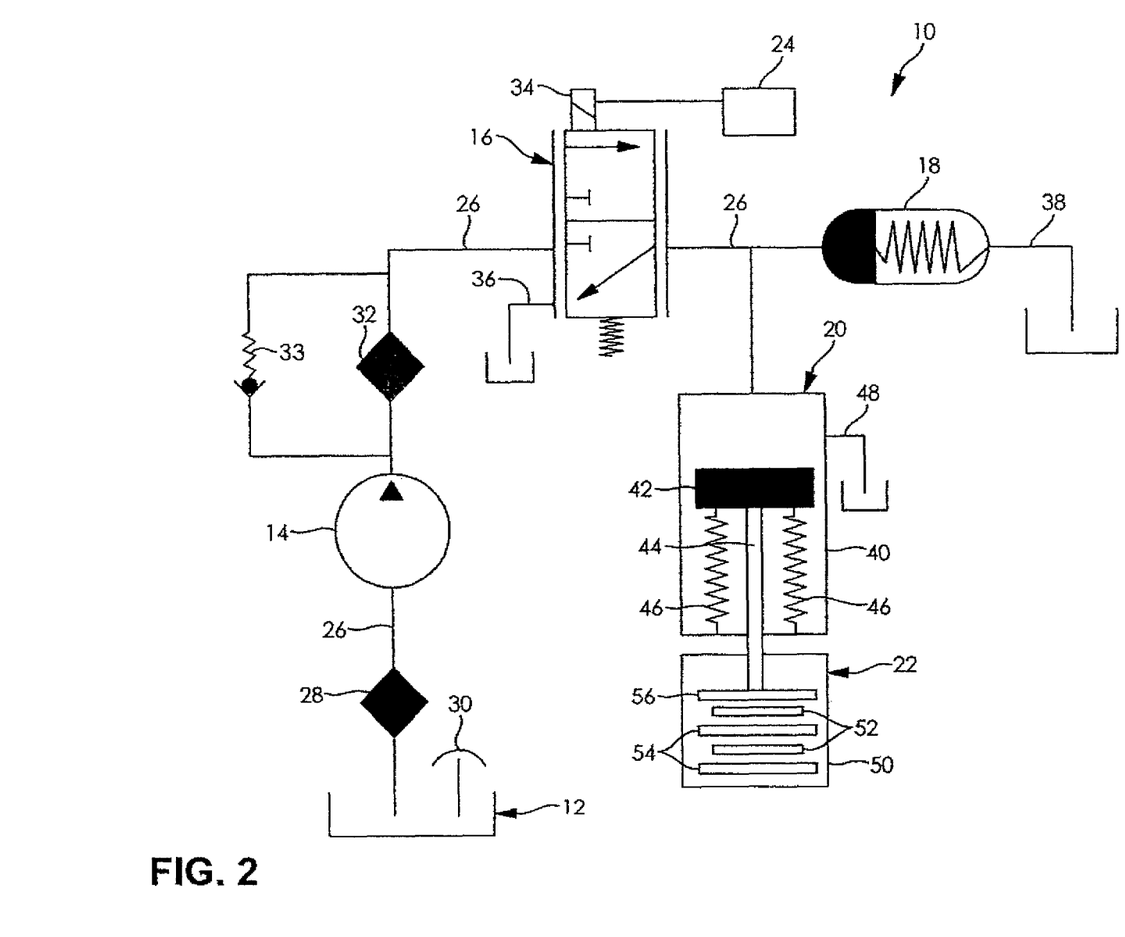
FIG. 2 is a schematic illustration of a clutch system according to the present invention.

FIG. 2 illustrates a clutch system 10 that may be used with the transmission. The clutch system 10 is an electrohydraulically actuated wet multi-plate clutch system. The clutch system 10 is an electrohydraulically actuated wet plate clutch system. The clutch system 10 comprises a sump 12, a high pressure pump 14, an electroproportional valve 16, an accumulator 18, a piston assembly 20, a clutch assembly 22, a controller 24, and a plurality of fluid conduits 26. The high pressure pump 14 is in fluid communication with the sump 12 and the electroproportional valve 16. The piston assembly 20 is in fluid communication with the electroproportional valve 16 and the accumulator 18. The clutch assembly 22 is disposed adjacent to and may be placed in contact with a portion of the piston assembly 20. The controller 24 is in communication with the electroproportional valve 16. For the purposes of this disclosure, it is understood that the controller 24 also implements the learning algorithm for updating the set of fill parameters. However, it is also understood that the learning algorithm for updating the set of fill parameters may also be implemented by a separate controller (not shown) in communication with the controller 24.

The sump 12 is a container in which a hydraulic fluid is stored. The sump 12 is in fluid communication with the high pressure pump 14. One of the fluid conduits 26 affords fluid communication between the sump 12 and the high pressure pump 14. A filter 28 forms a portion of the fluid conduit 26 between the sump 12 and the high pressure pump 14. The sump 12 includes a breather 30, to facilitate fluid communication between an ambient environment of the clutch system 10 and an interior of the sump 12.

The high pressure pump 14 is a fixed displacement hydraulic pump. The high pressure pump 14 is in fluid communication with the sump 12 and the electroproportional valve 16. As a non-limiting example, the high pressure pump 14 may generate a pressure of about 20 bar. One of the fluid conduits 26 affords fluid communication between the high pressure pump 14 and the electroproportional valve 16. A filter 32 forms a portion of the fluid conduit 26 between the high pressure pump 14 and the electroproportional valve 16. A pressure relief valve 33 is present to limit a pressure difference across the filter 32 created by the high pressure pump 14, such as if the filter 32 becomes obstructed. Further, it is understood that the high pressure pump 14 may also be in fluid communication with a pressure limiting valve (not shown). The pressure limiting valve limits a pressure within the fluid conduit 26 between the high pressure pump 14 and the electroproportional valve 16.

The electroproportional valve 16 is a hydraulic valve in fluid communication with the high pressure pump 14, the piston assembly 20, and the accumulator 18. The electroproportional valve 16 is in electrical communication with the controller 24. The electroproportional valve 16 is supplied with a pulse width modulated signal to apply a current to a solenoid 34 forming a portion of the electroproportional valve 16. Upon receipt of the pulse width modulated signal, the electroproportional valve 16 may be placed in at least a partially open position. In the open position, the electroproportional valve 16 afford fluid communication between the fluid conduit 26 between the high pressure pump 14 and the electroproportional valve 16 and a fluid conduit 26 between the electroproportional valve 16, the piston assembly 20, and the accumulator 18. It is understood that the controller 24 may adjust the pulse width modulated signal to adjust a pressure within the fluid conduit 26 between the electroproportional valve 16, the piston assembly 20, and the accumulator 18 by placing the electroproportional valve 16 in at least the partially open position. As shown in FIG. 2, the electroproportional valve 16 includes a draining orifice 36. A flow of hydraulic fluid through the draining orifice 36 is dependent on a pressure within the electroproportional valve 16, but also a viscosity of the hydraulic fluid and a temperature of the hydraulic fluid.

The accumulator 18 is a hydraulic device that dampens rapid changes in pressure (such as pressure drops or pressure peaks) within the fluid conduit 26 between the electroproportional valve 16 and the piston assembly 20. The accumulator 18 facilitates smooth operation of the clutch assembly 22. The accumulator 18 is in fluid communication with the piston assembly 20 and the electroproportional valve 16. As shown in FIG. 2, the accumulator 18 includes a draining orifice 38. A flow of hydraulic fluid through the draining orifice 38 is dependent on a pressure within the fluid conduit 26 between the electroproportional valve 16 and the piston assembly 20, but also a viscosity of the hydraulic fluid and a temperature of the hydraulic fluid.

The piston assembly 20 comprises a housing 40, a piston 42, a piston rod 44, and at least one return spring 46. The housing 40 is a hollow, cylindrical member in fluid communication with the electroproportional valve 16 through the fluid conduit 26 between the electroproportional valve 16, the piston assembly 20, and the accumulator 18. The piston 42 is a cylindrical member sealingly and slidingly disposed within the housing 40. The piston rod 44 is an elongate member in driving engagement with the piston 42. The piston rod 44 is sealingly and slidingly disposed through the housing 40. The at least one return spring 46 is a biasing member disposed between the piston 42 and the housing 40. When pressure at or above an engagement threshold is applied to the housing 40 by the electroproportional valve 16, the pressure within the housing 40 urges the piston 42 and the piston rod 44 towards the clutch assembly 22, while also compressing the at least one return spring 46. When pressure at or below a disengagement threshold is present within the housing 40, the at least one return spring 46 urges the piston 42 and the piston rod 44 into a starting position. As shown in FIG. 2, the housing 40 includes a draining orifice 48. A flow of hydraulic fluid through the draining orifice 48 is dependent on a pressure within the housing 40, a portion of which may be generated by centripetal forces, but also a viscosity of the hydraulic fluid and a temperature of the hydraulic fluid.

The clutch assembly 22 comprises a housing 50, a first plurality of plates 52, a second plurality of plates 54, and a pressure plate 56. The housing 50 is a hollow member into which a transmission fluid is disposed. The first plurality of plates 52 and the second plurality of plates 54 are rotatingly disposed within the housing 50. The pressure plate 56 is disposed adjacent the first plurality of plates 52 and the second plurality of plates 54 and may be urged towards the first plurality of plates 52 and the second plurality of plates 54 by the piston rod 44. The first plurality of plates 52 is interleaved with the second plurality of plates 54. Within the clutch assembly 22, an input member (not shown) is drivingly engaged with one of the first plurality of plates 52 and the second plurality of plates 54 and an output member (not shown) is drivingly engaged with a remaining one of the first plurality of plates 52 and the second plurality of plates 54. A pressure in which the piston rod 44 contacts the pressure plate 56 and where additional pressure would result in at least variable driving engagement between the first plurality of plates 52 and the second plurality of plates 54 is known as a kiss pressure. At pressures greater than the kiss pressure, torque is able to be transferred from the first plurality of plates 52 to the second plurality of plates 54 or from the second plurality of plates 54 to the first plurality of plates, depending on a configuration of the clutch assembly 22. When pressure at or above the engagement threshold is applied to the housing 40 by the electroproportional valve 16, the pressure within the housing 40 urges the piston 42 and the piston rod 44 towards the clutch assembly 22, applying a pressure to the first plurality of plates 52 and the second plurality of plates 54 through the pressure plate 56. In response to the pressure, the first plurality of plates 52 becomes at least variably drivingly engaged with the second plurality of plates 54, causing the input member to be at least variably drivingly engaged with the output member.

It is understood that the schematic illustration shown in FIG. 2 is merely exemplary in nature, and that the invention may be adapted for use with any wet plate clutch system.

Figure 3:
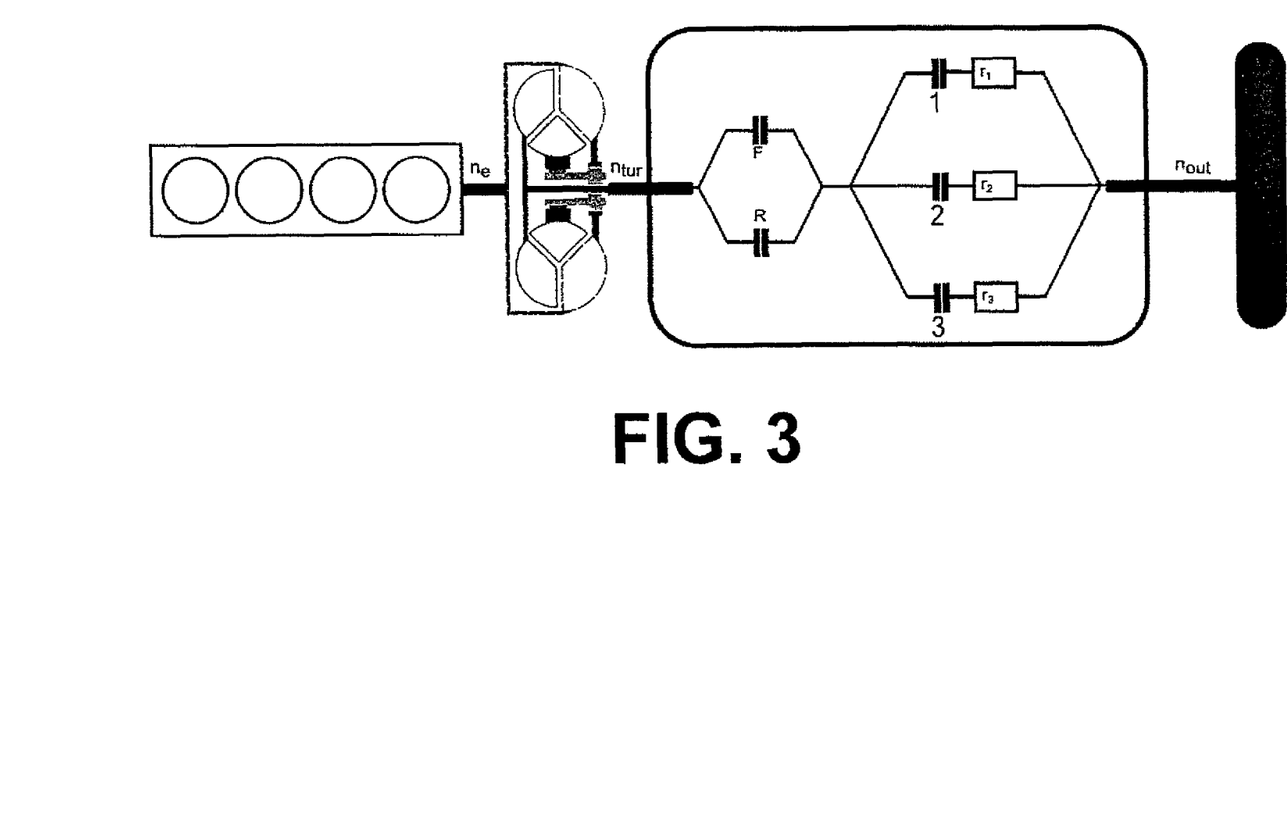
FIG. 3 schematically illustrates an exemplary layout of a powertrain including the clutch system shown in FIG. 2.

FIG. 3 schematically illustrates an exemplary layout of a powertrain 300. It is understood that the powertrain 300 includes the clutch system 10 illustrated in FIG. 2. The power train 300 includes a power source 302, which may be an internal combustion engine. Alternately, it is understood that the power source 302 may be an electric motor or a hybrid power source. As shown in FIG. 3, an output rotational speed of the power source 302 is indicated as $n_e$. The power source 302 is in driving engagement with a torque converter 304, which in turn is in driving engagement with a gearbox 306. As shown in FIG. 3, an output rotational speed of the torque converter 304 is indicated as $n_{tur}$. It is understood that the gearbox 306 shown in FIG. 3 is exemplary in nature. The gearbox 306 includes a plurality of the clutch assemblies 22. As mentioned hereinabove, the clutch assemblies 22 are hydraulic actuate, and are multi-plate, wet clutches. In response to engagement of at least two of the clutch assemblies 22, a direction selection (such as forward or reverse) and a speed selection is made. Depending on the clutch assemblies 22 that are engaged, an output rotation and speed are selected. As shown in FIG. 3, an output rotational speed of the gearbox 306 is indicated as $n_{out}$.

The power source 302 powers a pump portion 308 of the torque converter 304 which pumps oil towards a turbine portion 310 of the torque converter 304. Consequently, due to a flow of oil, torque is produced at the turbine portion 308 of the torque converter 304 which results, depending on a load applied to the turbine portion, in a certain turbine speed ($n_{tur}$). A speed ratio (SR) of the torque converter 304 may be defined by the equation $SR=n_{tur}/n_e$. A torque of the pump portion 308 and the turbine portion 310 depend on a speed of the pump (which is equal to $n_e$) and the speed ratio (SR). Accordingly, it can be concluded that the speed ratio is a relatively accurate way to measure an amount of input torque applied to the gearbox 306. The speed ratio of the torque converter 304 may be calculated using information obtained from at least one sensor 312 using the controller 24. Further, it is understood that information may be provided to the controller 24 via a vehicle communication bus (not shown), for example, such as the speed of the power source 302, the speed of the gearbox 306, information about a selected gear and a vehicle speed so that the controller 24 can calculate the speed ratio of the torque converter 304.

The learning algorithm implemented by the controller 24 and used with the clutch system 10 performs two steps to update a set of fill parameters. The two steps are measurement evaluation and learning the set of corrected fill parameters.

In the first step, the measurement from an executed shift is evaluated. This evaluation rests on a profile detection by the controller 24 based on an estimated torque output of the torque converter. The torque output of the torque converter may be estimated by performing an analysis on the speed ratio of the torque converter 304. Since there are two parameters that are evaluated (fill time and kiss pressure), and both parameters can be either too low or too high, it is understood that several combinations are possible. If the fill time is of too great of a duration, a dynamic called overfill occurs. If the fill time is of too quick of a duration, a dynamic called underfill occurs. With regards to kiss pressure, a dynamic called underkiss occurs if the pressure at the end of the fill profile is too low. Further, a dynamic called overkiss occurs if the pressure at the end of the fill profile is too high. Each of these dynamics are further described below in further detail, which can be further understood in view of FIGS. 1 and 2.

With overfill, the pressure plate 56 contacts the plates 52, 54 during the filling profile. Consequently, a speed ratio of the torque converter 304 drops immediately. As a nominal kiss pressure is reached, the speed ratio of the torque converter 304 increases again, to a value slightly less than one.

With underfill, during the filling profile, the piston 42 does not reach an end position, and the pressure plate 56 does not apply force to the plates 52, 54. Consequently, no torque is transferred through the clutch assembly 22, even in the kiss pressure part of the profile. As a result, a delayed response of the clutch assembly 22 occurs.

With overkiss, after a filling that is of the proper amount, the plates 42, 54 are pushed against each other due to a kiss pressure being too great, torque is transferred during this phase, and has an effect on the speed ratio of the torque converter 304. As an amount of overkiss increases, the lower the speed ratio will drop and stabilize.

With underkiss, after a filling that is of the proper amount, the piston 42 retracts because the pressure is too low to hold the piston 42 at its end position (as a result of force applied by the return spring 46). Underkiss does not have an effect on the speed ratio, however, a delayed response can be noted.

Figure 4A:
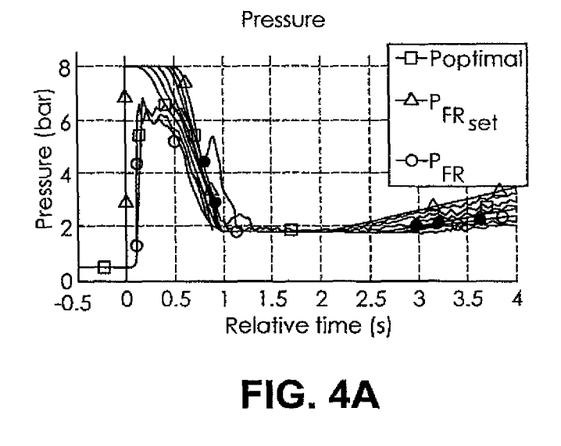
FIGS. 4A through 4D are charts which illustrate a set of experiments where a correct amount of kiss pressure is applied and a range of fill times indicative of underfill and overfill.
Figure 4B:
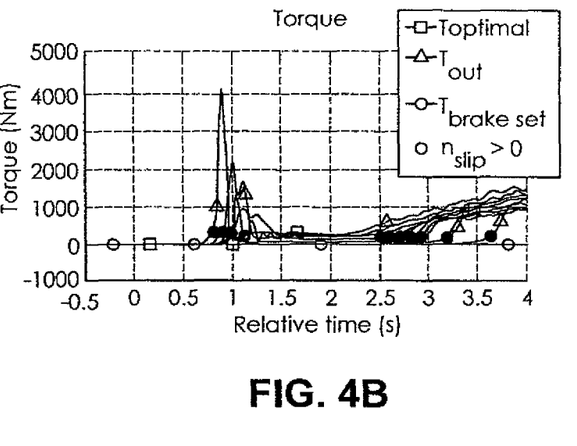
Figure 4C:
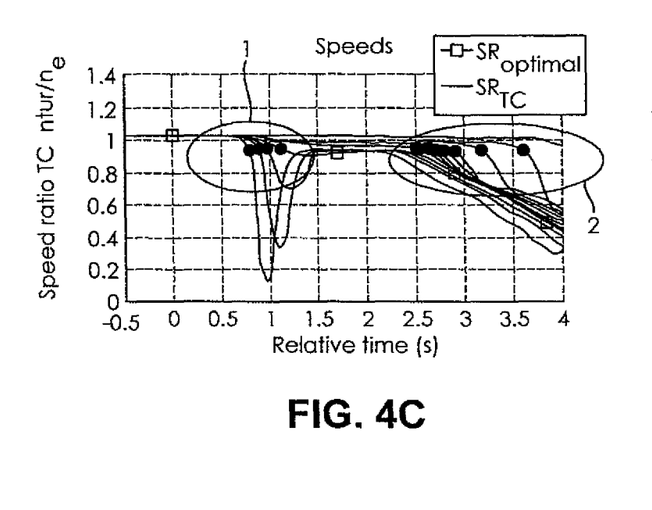
Figure 4D:
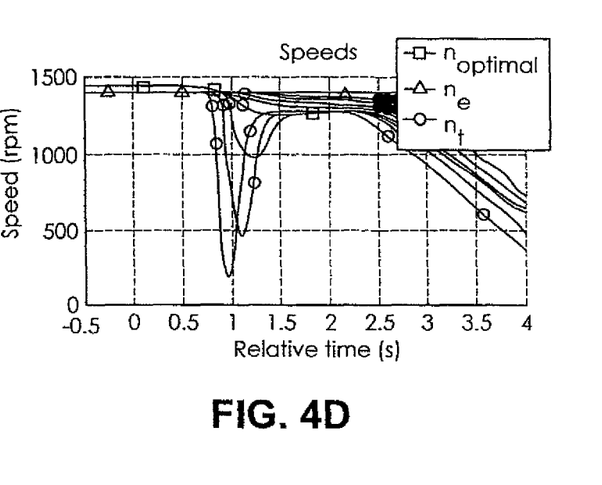

FIGS. 4A through 4D are charts which illustrate a set of experiments where a correct amount of kiss pressure is applied and a range of fill times indicative of underfill and overfill. FIG. 4A illustrates the pressure profiles for the set of experiments. FIG. 4C illustrates the speed ratio for the torque converter 304 for the set of experiments. FIG. 4B depicts a measured torque at an output shaft. FIG. 4D depicts the speeds of the engine 302, the speed of the turbine portion 310.

The results of the set of experiments are shown in relative time which can be defined by the equation $t_{rel}=t/t_{fill}$, where t is equal to zero at a start of the (reference) filling pulse. Accordingly, all the filling profiles end at a relative time of 1. For each filling experiment, the point where the speed ratio of the torque converter 304 drops below 0.95 is shown as a dot in FIGS. 4A through 4D.

The set of experiments indicated that a suitable or "good" shift may be defined as when the speed ratio of the torque converter 304 drops below about 0.95 as close as possible to a relative time of $1.5 \times t_{fill}$. It is understood that similar values to a threshold value of 0.95 may also be indicative of a suitable shift. Further, it is also understood that a range of the relative time ratio may be from about $1.2 \times t_{fill}$ to about $1.5 \times t_{fill}$. Overfill can be detected as an early drop in the speed ratio of the torque converter 304. Reference number 1 in FIG. 4C illustrates an area of the chart illustrative of the overfill dynamic. Underfill can be detected as a late drop in the speed ratio of the torque converter 304. Reference number 2 in FIG. 4C illustrates an area of the chart illustrative of the underfill dynamic.

Figure 5A:
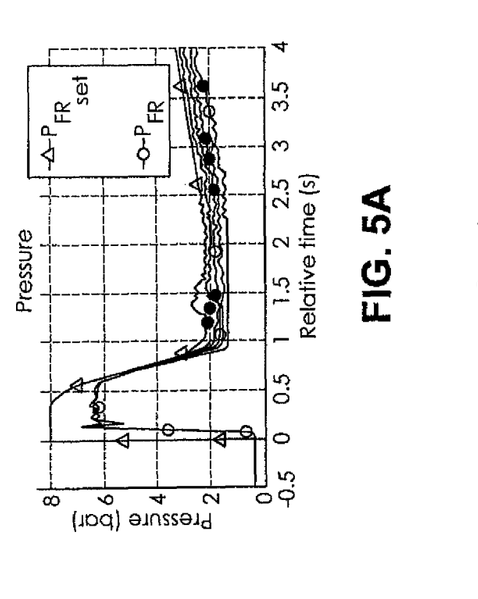
FIGS. 5A through 5D are charts which illustrate a set of experiments similar to the set shown in FIGS. 4A through 4D, but where a correct filling time was used and a range of kiss pressures were evaluated.
Figure 5B:
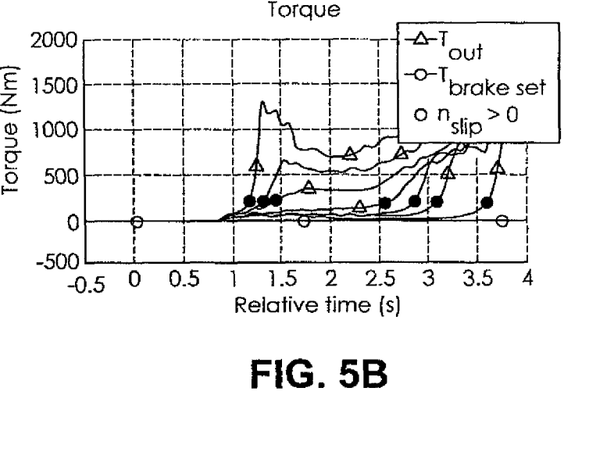
Figure 5C:
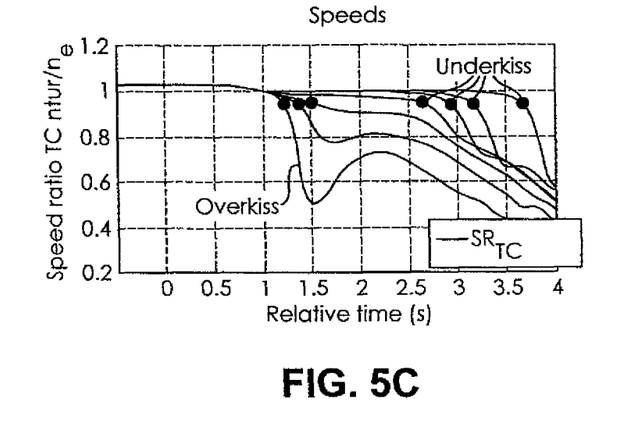
Figure 5D:
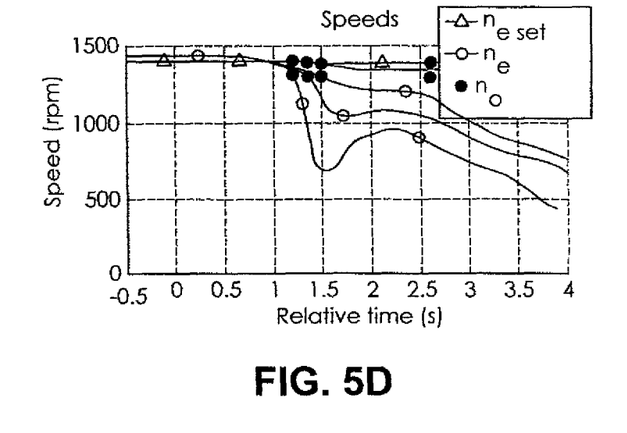

FIGS. 5A through 5D are charts which illustrate a set of experiments similar to the set shown in FIGS. 4A through 4D, but where a correct filling time was used and a range of kiss pressures were evaluated. As expected and shown in FIG. 5C, there is no response in the speed ratio of the torque converter 304 for the underkiss values during the kiss pressure time. For underkiss, a delayed response can be noticed. As also shown in FIG. 5C, as the kiss pressure increases the response time becomes shorter and even the speed ratio of the torque converter 304 stabilizes around a certain value, depending on the height of overkiss.

Based on the abovementioned speed ratio observations for filling and kiss pressure, it is possible to use this information to perform the second step of the learning algorithm, learning the correct filling parameters. As a part of the second step, two different checks are performed by the controller 24.

A first check occurs by analyzing the relative time when the speed ratio of the torque converter 304 drops below the 0.95 line. This check indicates the correctness of the filling, and can be seen in FIG. 4C. Based on the aforementioned observations, it has been determined that a filling is correct when the speed ratio of the torque converter 304 first drops below the 0.95 line occurs when the value of $t_{rel}$ is between about 1.2 and 1.5. An early crossing below the 0.95 line indicates the overfill dynamic and a late crossing below the 0.95 line indicates the underfill dynamic.

A second check only can be performed correctly when the filling pulse is not underfilled. The average speed ratio of the torque converter 304 between about 1.5 and about 2.5 the value of $t_{rel}$ is indicative of the load of the torque converter 304 during the stabilization part of the pressure profile. If the value of the speed ratio of the torque converter 304 is greater than 0.95, it is indicative that the torque converter 304 is not loaded during the stabilization part, which may be indicative of, for example, too low of a kiss pressure. If the value of the speed ratio of the torque converter 304 is less than 0.9, it is indicative of a certain load being applied to the torque converter 304, and thus the clutch assembly 22 is transferring torque, which may be indicative of, for example, that the kiss pressure is too high.

FIGS. 6-9 illustrate that through the use of the learning algorithm of the present invention, even combinations of faults are detectable.

Figure 6A:
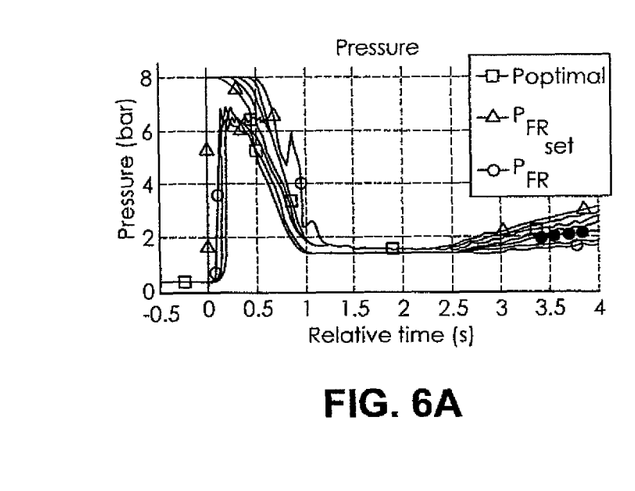
FIGS. 6A through 6D are charts which illustrate a set of experiments exhibiting a severe underkiss situation with varying fill time.
Figure 6B:
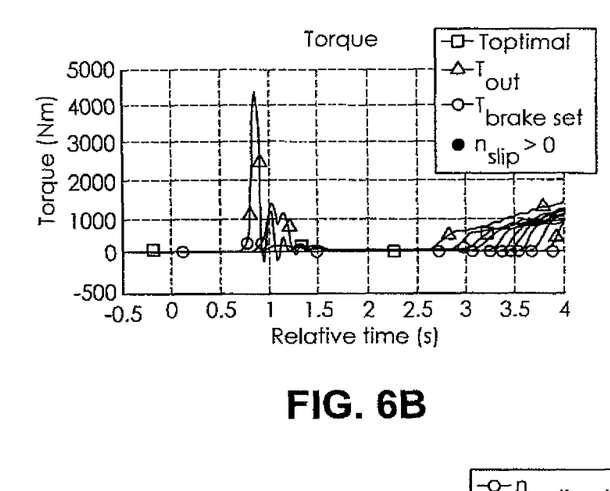
Figure 6C:
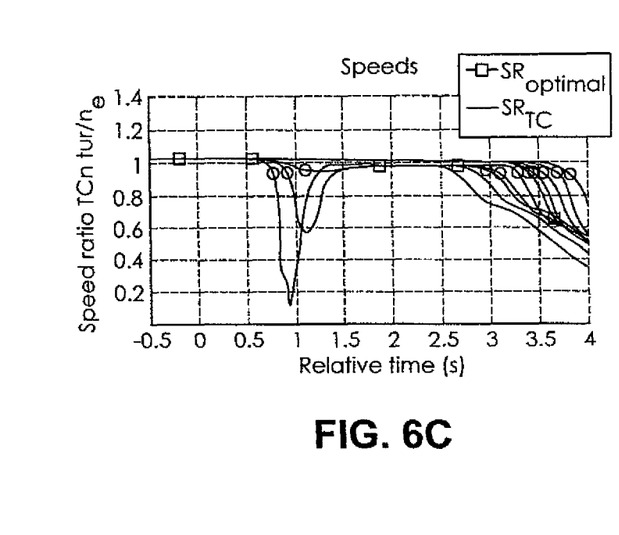
Figure 6D:
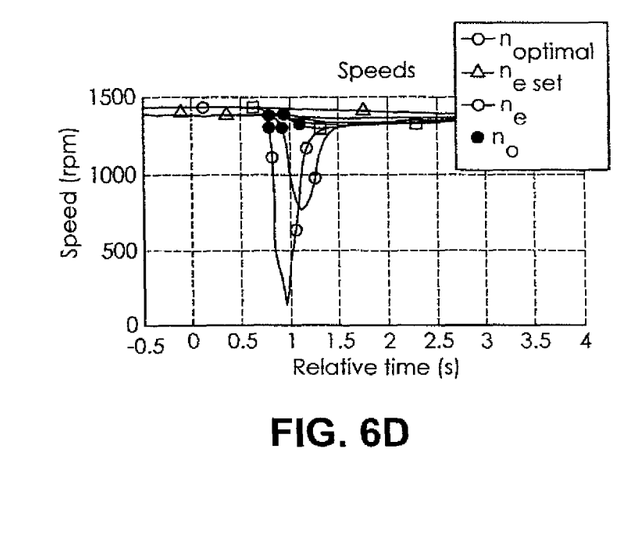

FIGS. 6A through 6D are charts which illustrate a set of experiments exhibiting a severe underkiss situation with varying fill time. Underkiss is detected when the speed ratio of the torque converter 304 remains substantially constant at about a relative time of 1 after the filling time, as shown in FIG. 6C. Underfill and underkiss is a dynamic that is exemplified by a severe delayed response. Overfill is detected by a drop in the speed ratio of the torque converter 304, as also shown in FIG. 6C.

Figure 7A:
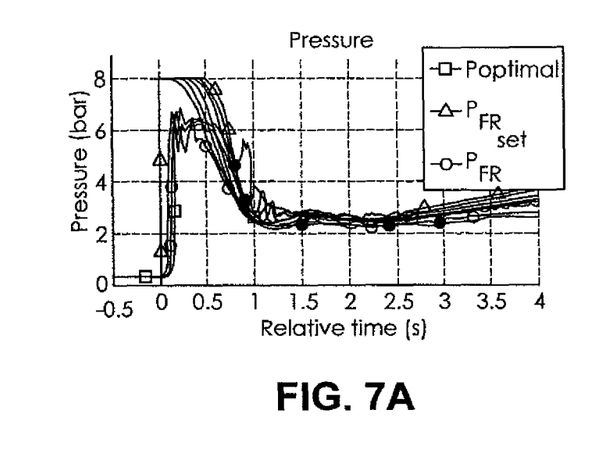
FIGS. 7A through 7D are charts which illustrate a set of experiments exhibiting a severe overkiss situation with a changing fill time.
Figure 7B:
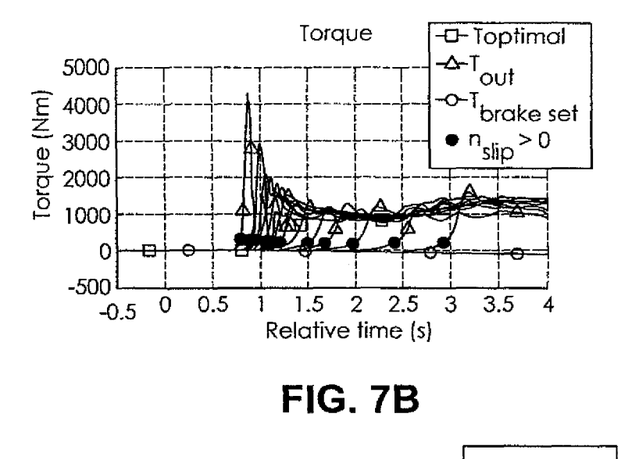
Figure 7C:
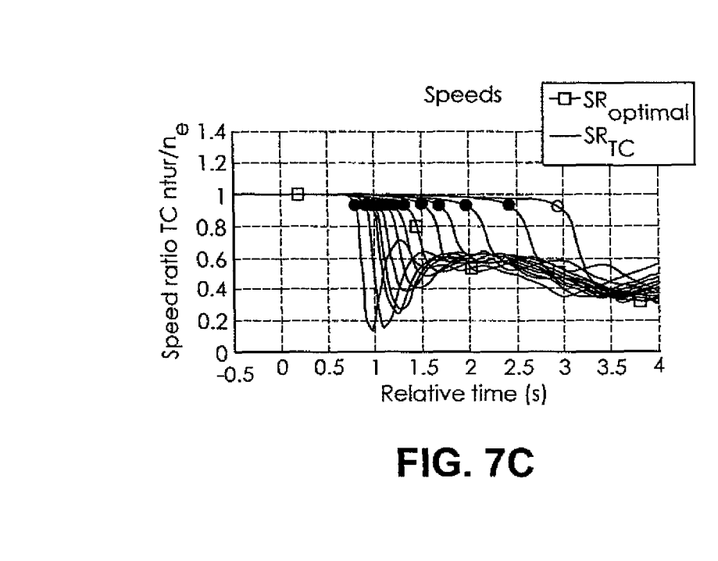
Figure 7D:
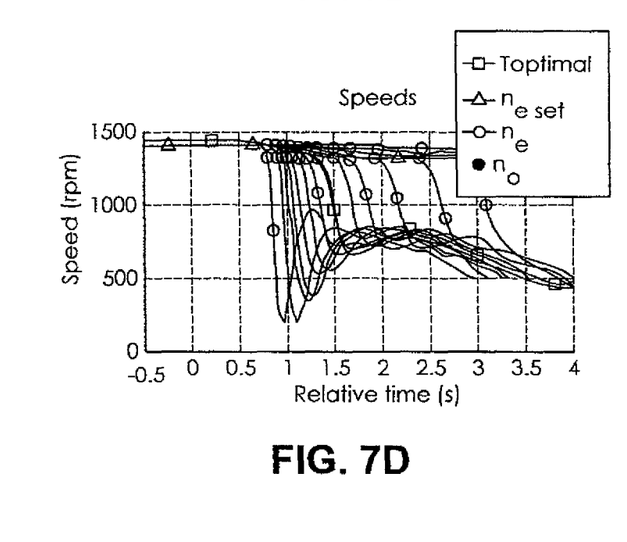

FIGS. 7A through 7D are charts which illustrate a set of experiments exhibiting a severe overkiss situation with a changing fill time. As shown in FIG. 7C The overkiss is detected by the stabilization of the speed ratio of the torque converter 304 between approximately 1.5 and 2.5 the value of $t_{rel}$, but only in the event that no underfilling has occurred. The timing of the stabilization can be used to determine a measure for the correctness of the filling.

Figure 8A:
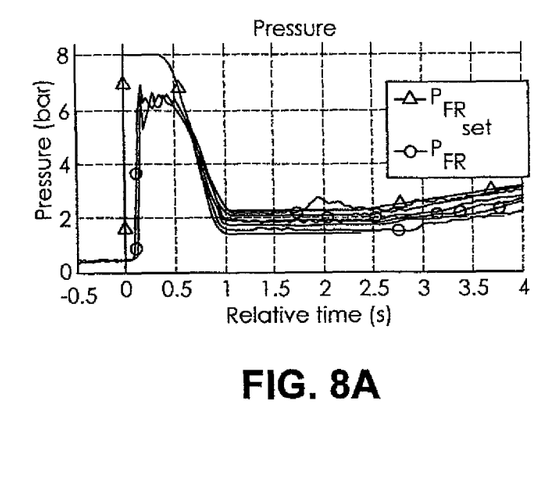
FIGS. 8A through 8D are charts which illustrate a set of experiments exhibiting a severe underfill and varying kiss pressure.
Figures 8B, 8D:
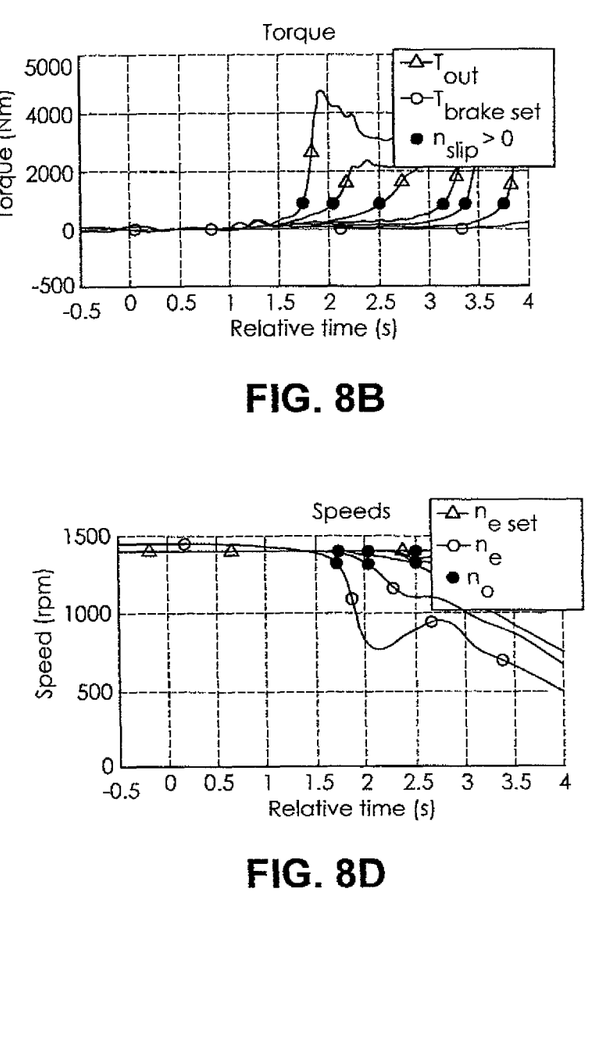
Figure 8C:
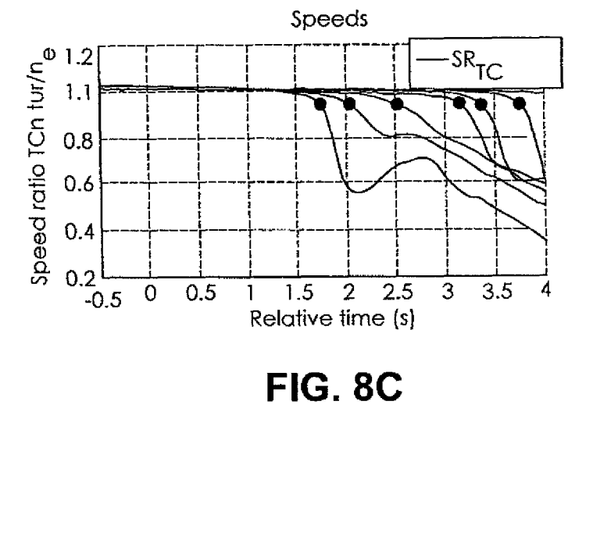

FIGS. 8A through 8D are charts which illustrate a set of experiments exhibiting a severe underfill and varying kiss pressure. Underkiss is detected by an overall delayed response. As shown in FIG. 8C, the overkiss is detected by the stabilization of the speed ratio of the torque converter 304 between approximately 1.5 and 2.5 the value of $t_{rel}$, however the reliability is quite low due to the severe underfill.

Figure 9A:
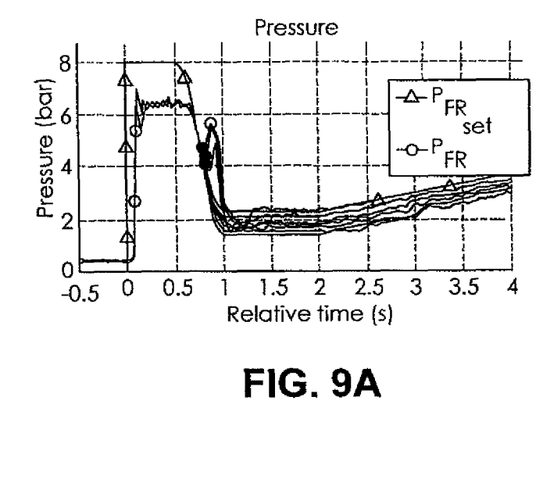
FIGS. 9A through 9D are charts which illustrate a set of experiments exhibiting a severe overfill and varying kiss pressure.
Figure 9B:
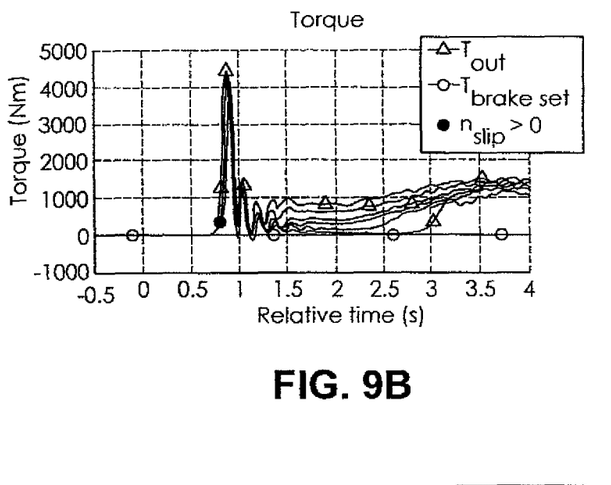
Figure 9C:
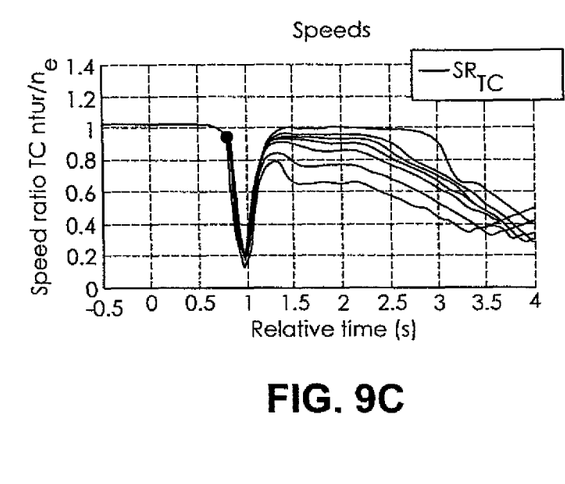
Figure 9D:
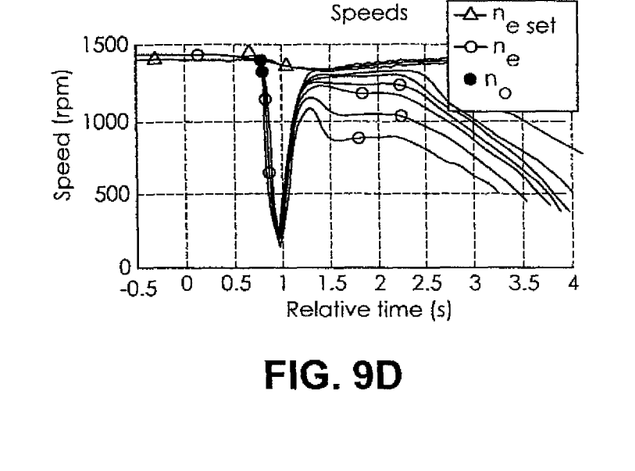

FIGS. 9A through 9D are charts which illustrate a set of experiments exhibiting a severe overfill and varying kiss pressure. As shown in FIG. 9C, Overfill is detected by the fast drop in speed ratio. Overkiss is detected by the stabilizing of the speed ratio of the torque converter 304 between approximately 1.5 and 2.5 the value of $t_{rel}$. Underkiss becomes evident when the speed ratio of the torque converter 304 increases to a value above 0.95 after the initial filling.

Based on the abovementioned features of the speed ratio profiles of the torque converter 304, the controller 24 can implement the learning algorithm to tune the filling parameters of each of the clutch assemblies 22 in an online manner, which eliminates a need for recalibrating the gearbox 306 and accommodates production variances for components and assembly of the clutch system 10.

Figure 10:
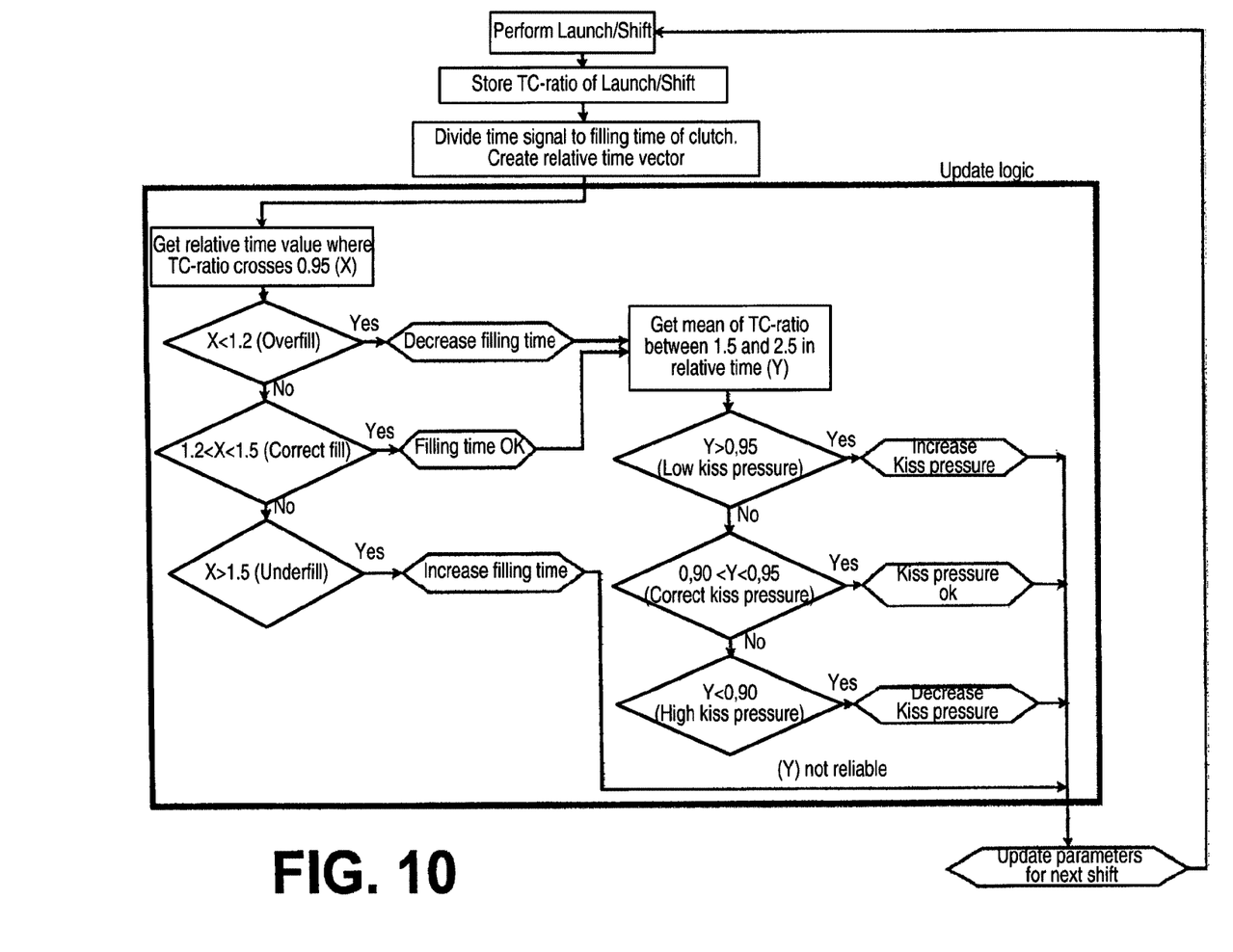
FIG. 10 is a logic flow chart of a learning algorithm which is implemented by the controller shown in FIG. 2.

FIG. 10 is a logic flow chart of the learning algorithm which is implemented by the controller 24. As mentioned hereinabove, the learning algorithm is implemented during vehicle launches to be most effective.

When a launch is detected, information obtained from the at least one sensor 312 using the controller 24 about the speed ratio of the torque converter 304 with respect to time is stored regarding the launch period. Next, a time signal of the speed ratio is divided with respect to an amount of time required for filling the piston assembly 20 and a relative time vector is created to facilitate additional analysis.

Following this step, the learning algorithm applies additional logic steps to determine a manner in which to update the fill parameters. First, a relative time value where the speed ratio of the torque converter 304 crosses 0.95 is determined. Based on where this event occurs with respect to the relative time ratio, it can be determined if the clutch assembly 22 was overfilled, correctly filled, or underfilled. If the relative time value is less than 1.2 it can be determined the clutch assembly was overfilled, and that a filling time parameter needs to be decreased, which is noted and the learning algorithm moves onto the next step. If the relative time value is between the values of 1.2 and 1.5 it can be determined the clutch assembly was correctly filled, and that a filling time parameter should remain the same, which is noted and the learning algorithm moves onto the next step. If the relative time value is greater than 1.5 it can be determined the clutch assembly was underfilled, and that a filling time parameter should increase, which is noted and then the learning algorithm ends because additional information cannot be determined based on such a speed ratio profile, as mentioned hereinabove.

When the relative time value where the speed ratio of the torque converter 304 crosses 0.95 is less than 1.5, the learning algorithm moves onto the next step, which is to determine an average value of the speed ratio of the torque converter 304 between the relative time values of 1.5 and 2.5. Once this is performed by the controller 24, additional logic steps are applied to determine whether the kiss pressure needs to be adjusted. If the average value is greater than 0.95 it can be determined the kiss pressure was low, and that the kiss pressure needs to be increased, which is noted and then learning algorithm ends. If the average value is between 0.90 and 0.95 it can be determined the kiss pressure was correct, and that the kiss pressure should remain the same, which is noted and then learning algorithm ends. If the average value is less than 0.90 it can be determined the kiss pressure was high, and that the kiss pressure needs to be decreased, which is noted and then learning algorithm ends.

Lastly, using the information obtained from the two previous logical evaluations (or one in the case of underfill), the parameters of filling time and kiss pressure are updated by the controller 24. These parameters are then applied during the next shift of the clutch system 10. When the next launch is detected, the learning algorithm is applied again to update the parameters for the clutch system 10.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for determining filling parameters of a wet clutch system used with a transmission, the method comprising the steps of:
    determining a value regarding a torque output of a torque converter of the transmission, the value indicative of a filling parameter associated with the wet clutch system;
    collecting information about the torque output of the torque converter of the transmission during a filling process associated with the wet clutch system;
    analyzing a signal associated with the torque output of the torque converter within a time period of the filling process associated with the wet clutch system; and
    identifying when the signal associated with the torque output of the torque converter changes with respect to the time period of the filling process associated with the wet clutch system to determine a filling parameter associated with the wet clutch system.

2. The method according to claim 1, wherein information about the torque output of the torque converter of the transmission is collected using a sensor.

3. The method according to claim 1, wherein the filling parameters of the wet clutch system that are determined are fill time and kiss pressure.

4. The method according to claim 1, wherein the step of determining the value regarding the torque output of the torque converter is performed by determining at least one of a threshold value and an average value regarding a speed ratio of the torque converter of the transmission.

5. The method according to claim 1, wherein the step of identifying when the signal associated with the torque output of the torque converter changes with respect to the time period of the filling process is performed by at least one of identifying when a speed ratio falls below a determined threshold value and comparing an average value of the speed ratio to a determined average threshold value with respect to the time period of the filling process.

6. The method according to claim 5, wherein the step of comparing the collected speed ratio information to the time period of the filling process associated with the wet clutch system is performed by analyzing when the speed ratio of the torque converter drops below about 0.95.

7. The method according to claim 6, wherein the filling process associated with the wet clutch system is evaluated by analyzing when the speed ratio of the torque converter drops below about 0.95.

8. The method according to claim 6, wherein the filling process associated with the wet clutch system is determined to be correct when the speed ratio of the torque converter drops below about 0.95 when the time period of the filling process is between about 1.2 and about 1.5 times the time period of the filling process.

9. The method according to claim 6, wherein the filling process associated with the wet clutch system is determined to be overfilled when the speed ratio of the torque converter drops below about 0.95 when the time period of the filling process is less than about 1.2 times the time period of the filling process and the filling process is determined to be underfilled when the speed ratio of the torque converter drops below about 0.95 when the time period of the filling process is greater than about 1.5 times the time period of the filling process.

10. The method according to claim 5, wherein the step of comparing the collected speed ratio information to the time period of the filling process associated with the wet clutch system is performed by analyzing the average speed of the torque ratio between about 1.5 and about 2.5 times the time period of the filling process.

11. The method according to claim 10, wherein a kiss pressure associated with the wet clutch system is evaluated by analyzing the average speed of the torque ratio between about 1.5 and about 2.5 times the time period of the filling process.

12. The method according to claim 10, wherein a kiss pressure associated with the wet clutch system is determined to be correct when the average value of the torque ratio between about 1.5 and about 2.5 times the time period of the filling process is between about 0.90 and about 0.95.

13. The method according to claim 10, wherein a kiss pressure associated with the wet clutch system is determined to be low when the average value of the torque ratio between about 1.5 and about 2.5 times the time period of the filling process is greater than about 0.95 and the kiss pressure is determined to be high when the average value of the torque ratio between about 1.5 and about 2.5 times the time period of the filling process is less than about 0.90.

14. The method according to claim 1, wherein information about the torque output of the torque converter of the transmission is collected during a launch period of a vehicle the wet clutch system is incorporated in.

15. The method according to claim 12, wherein a relative time vector is created based on a time signal of the information about the torque output of the torque converter and the time period of the filling process.

16. The method according to claim 1, wherein determining the value, collecting information, analyzing the signal and identifying the signal is carried out during a shifting of the transmission.

17. A system for determining filling parameters of a wet clutch system used with a transmission, comprising:
    the transmission including a torque converter and at least one sensor;
    the wet clutch system including a piston assembly and a clutching assembly, the clutching assembly for engaging a portion of the transmission;
    a controller in communication with a portion of the wet clutch system and the at least one sensor, wherein information about a torque output of the torque converter during a filling process associated with the wet clutch system is collected using the at least one sensor and the controller and compared to a time period of the filling process associated with the wet clutch system, the controller identifying when information about the torque output of the torque converter changes with respect to the time period of the filling process associated with the wet clutch system to determine a filling parameter associated with the wet clutch system.

* * * * *